(12) United States Patent
Pellegatti et al.

(10) Patent No.: US 8,735,498 B2
(45) Date of Patent: *May 27, 2014

(54) SOFT POLYOLEFIN COMPOSITIONS WITH IMPROVED PROCESSABILITY

(75) Inventors: Giampaolo Pellegatti, Boara (IT); Paolo Goberti, Vigarano Mainarda (IT); Johan De Clippeleir, Oud heverlee (BE); Stefano Spataro, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 36 days.

This patent is subject to a terminal disclaimer.

(21) Appl. No.: 13/504,460

(22) PCT Filed: Nov. 8, 2010

(86) PCT No.: PCT/EP2010/067012
§ 371 (c)(1),
(2), (4) Date: Jun. 21, 2012

(87) PCT Pub. No.: WO2011/061087
PCT Pub. Date: May 26, 2011

(65) Prior Publication Data
US 2012/0264883 A1    Oct. 18, 2012

Related U.S. Application Data

(60) Provisional application No. 61/281,658, filed on Nov. 20, 2009.

(30) Foreign Application Priority Data

Nov. 17, 2009    (EP) .................................... 09176231

(51) Int. Cl.
C08F 8/00    (2006.01)
C08L 23/06    (2006.01)
C08L 23/10    (2006.01)

(52) U.S. Cl.
USPC ........................................ 525/191; 525/240

(58) Field of Classification Search
CPC ..... C08L 23/0815; C08L 23/14; C08L 23/20; C08L 2205/02; C08L 2205/03
USPC ................................................ 525/191, 240
See application file for complete search history.

(56) References Cited

U.S. PATENT DOCUMENTS

| | | |
|---|---|---|
| 4,399,054 A | 8/1983 | Ferraris et al. |
| 4,472,524 A | 9/1984 | Albizzati |
| 5,948,547 A | 9/1999 | Mikielski et al. |
| 6,277,918 B1 | 8/2001 | Collina et al. |
| 6,667,364 B2 | 12/2003 | Abraham et al. |
| 8,202,611 B2 | 6/2012 | Bigiavi et al. |
| 2006/0020096 A1 | 1/2006 | Schottek et al. |
| 2011/0190450 A1* | 8/2011 | De Palo et al. ................ 525/240 |
| 2012/0171405 A1* | 7/2012 | Pasquali et al. .............. 428/36.9 |
| 2013/0102735 A1* | 4/2013 | Minowa et al. ............... 525/240 |

FOREIGN PATENT DOCUMENTS

| | | |
|---|---|---|
| CN | 101087844 | 12/2007 |
| EP | 045977 | 2/1982 |
| EP | 483523 | 5/1992 |
| EP | 560326 | 9/1993 |
| EP | 0627464 | 12/1994 |
| EP | 0674991 | 10/1995 |
| WO | WO-98/40419 | 9/1998 |
| WO | WO-98/54251 | 12/1998 |
| WO | WO-00/11076 | 3/2000 |
| WO | WO-03/011962 | 2/2003 |
| WO | WO-03/031514 | 4/2003 |
| WO | WO-2004/048424 | 6/2004 |
| WO | WO-2004/099269 | 11/2004 |
| WO | WO-2006/042815 | 4/2006 |
| WO | WO-2008/017525 | 2/2008 |
| WO | WO-2009/000637 | 12/2008 |
| WO | WO-2009/024435 | 2/2009 |
| WO | WO-2009/068371 | 6/2009 |
| WO | WO-2010/034684 | 4/2010 |
| WO | WO2010/069775 | 6/2010 |
| WO | WO 2011/064131 | 6/2011 |

OTHER PUBLICATIONS

Journal of Applied Physics, vol. 35,1964 , p. 3241.

* cited by examiner

*Primary Examiner* — Nathan M Nutter

(57) ABSTRACT

Soft polyolefin composition with improved processability comprising from 8 to 45% by weight of a polypropylene component (A), from 45 to 82% by weight of a polyolefin component (B), and from 5 to 25% by weight of a butene-1 (co)polymer (C) having a flexural modulus of 60 MPa or less.

10 Claims, No Drawings

SOFT POLYOLEFIN COMPOSITIONS WITH IMPROVED PROCESSABILITY

This application is the U.S. national phase of International Application PCT/EP2010/067012, filed Nov. 8, 2010, claiming priority to European Application 09176231.0 filed Nov. 17, 2009 and the benefit under 35 U.S.C. 119(e) of U.S. Provisional Application No. 61/281,658, filed Nov. 20, 2009; the disclosures of International Application PCT/EP2010/067012, European Application 09176231.0 and U.S. Provisional Application No. 61/281,658, each as filed, are incorporated herein by reference.

The present invention relates to soft polyolefin compositions with improved processability, obtained by addition of specific butene-1 polymers as processing aids.

Soft polyolefin compositions can be obtained by blending a crystalline thermoplastic fraction with an elastomeric fraction. Typically, such compositions are heterophasic since the crystalline fraction constitutes a matrix in which the elastomeric phase is finely dispersed.

Soft heterophasic polyolefin compositions can be obtained by a variety of processes, including sequential polymerisation in multiple reactors, to produce in-reactor blends.

Soft polyolefin compositions having elastic properties but still retaining a thermoplastic behaviour are used in many applications since they can be transformed into shaped articles by the same fabrication processes used for thermoplastic polymers, including extrusion processes and injection moulding.

Soft polyolefin compositions in which the crystalline fraction comprises a substantial amount of a propylene homopolymer or a random copolymer of propylene with ethylene and or another α-olefin, and the elastomeric fraction comprises a substantial amount of an elastomeric ethylene-propylene copolymer, optionally containing a diene (EPDM), can advantageously be prepared by sequential polymerisation in at least two reactors in the presence of a Ziegler-Natta or a metallocene catalyst system, as described for example in WO 03/011962.

Compositions comprising a substantial amount of an elastomeric fraction having a high intrinsic viscosity, however, may be difficult to process in the molten state due to a very low melt flow rate (MFR), often below 1.

Generally, a widely used technique to increase the MFR of a polyolefin material is visbreaking.

The process of visbreaking a polyolefin material is well known to those skilled in the art. Generally, it is carried out by using a peroxide in liquid or powder form or absorbed on a carrier. The polyolefin composition/peroxide mixture is then introduced into a means for thermally plasticizing and conveying the mixture, e.g., an extruder at elevated temperature. Residence time and temperature are controlled in relation to the particular peroxide selected (i.e., based on the half-life of the peroxide at the process temperature of the extruder) so as to effect the desired degree of polymer chain degradation. The result is to narrow the molecular weight distribution of the polymers present in the composition, as well as to reduce the overall molecular weight and thereby increase the MFR relative to the as-polymerized polymer. For example, a polymer with a fractional MFR (i.e., less than 1), or a polymer with a MFR of 0.5-10, can be selectively visbroken to a MFR of 15-50 by selection of peroxide type, extruder temperature and extruder residence time. Sufficient care should be exercised in the practice of the procedure to avoid cross-linking in the presence of an ethylene-containing copolymer. Peroxide visbreaking, however, results often in sticky materials and in worsening of mechanical properties. Therefore, improved processability obtained by visbreaking suffers the big disadvantage of a lower quality of the polyolefin composition.

Use of melt viscosity reducing agents instead of visbreaking to improve processability of certain polyolefin materials is disclosed in the patent literature.

U.S. Pat. No. 6,277,918 B1 discloses the use of crystalline polybutene-1 with polyolefin compositions comprising a substantial amount (above 75% by weight) of an ethylene copolymer of the LLDPE type.

U.S. Pat. No. 6,667,364 B2 discloses the use of a melt viscosity reducer to improve the processability of PE-rich TPV ("thermoplastic vulcanizates") in which PE is the continuous hard phase and a particular EPDM rubber is the soft phase. Viscosity reducers disclosed in this patent include isotactic poly(1-butene) and certain oils or waxes. The high viscosity of these compositions is attributable to the compatibility of PE with EPDM rubber. A TPV in which either PP or the rubber is present in a larger amount than the other is deemed to be processable (column 2, lines 51-55).

The cited documents do not offer a solution to the poor processability in the molten state of soft polyolefin compositions comprising essentially a crystalline propylene (co)polymer and a substantial amount of an ethylene-propylene elastomeric copolymer component.

In order to achieve such goal, it has been proposed, according to WO2009/024435, to blend a soft polyolefin composition with 10 to 25% by weight of a viscosity reducing agent comprising a butene-1 polymer (homo- or copolymer) and a paraffinic wax or grease.

The said butene-1 polymer is preferably a highly isotactic homopolymer having a high MFR. Actually in the examples a homopolymer with relatively high Flexural Elastic Modulus, namely 487 MPa, typical for highly isotactic, significantly crystalline butene-1 polymers, and MFR of 175 g/10 min., is used.

In the comparative examples it is shown that when only the butene-1 polymer is added, thus in the absence of the paraffinic wax or grease, the mechanical properties of the resulting composition are significantly worsened with respect to the properties of the soft polyolefin composition in the pure state. In particular, the Flexural Modulus is sensibly increased and the elongation at break is remarkably worsened.

It has now been found that by using as viscosity reducing agent a particular kind of butene-1 polymers, it is possible to obtain soft polyolefin compositions having a satisfactory balance of processabilty and mechanical properties, even in the absence of the paraffinic wax or grease. Thus the compositions of the present invention do not necessarily contain low molecular weight components, like the said wax or grease, so that the problem of possible surface migration of the same, with consequent modification of the surface properties of the final article, is clearly absent. Moreover, due to the reduced number of components, the compositions of the present invention can be easily prepared and processed.

Therefore the present invention relates to polyolefin compositions comprising:
A) from 5 to 45% by weight of a polypropylene component comprising a propylene homopolymer or a propylene copolymer with another α-olefin or combinations thereof, said polypropylene component containing at least 85% by weight of propylene, and having a solubility in xylene at room temperature lower than 20% by weight;
B) from 82 to 45% by weight of a polyolefin component comprising a copolymer or a composition of copolymers of ethylene with at least one other α-olefin, containing from 15% by weight to 70% by weight, preferably from 15 to 40% by weight of ethylene, said polyolefin component having a solubility in xylene at room temperature greater than 60% by weight;

C) from 2.5 to 25% by weight of a butene-1 (co)polymer having:
- a content of butene-1 derived units of 75 wt % or more, preferably of 80 wt % or more, more preferably of 84 wt % or more, even more preferably of 90 wt % or more;
- a flexural modulus of 60 MPa or less, preferably of 40 MPa or less, more preferably 30 MPa or less.

The said amounts of A), B) and C) are referred to the total weight of A)+B)+C).

From the above definitions it is evident that the term "copolymer" includes polymers containing more than one kind of comonomers.

By "room temperature" is meant herein a temperature of about 25° C.

Typically, the polyolefin compositions of the invention exhibit low flexural modulus values, i.e. lower than 100 MPa, preferably lower than 60 MPa, more preferably lower than 30 MPa, and a Shore A hardness lower than 90, preferably from 65 to 80.

Preferably, the soft polyolefin compositions of the invention comprise from 8 to 30% by weight, more preferably from 8 to 20%, most preferably from 10 to 15% of polypropylene component (A); from 50 to 80% by weight, more preferably from 60 to 80%, most preferably from 65 to 75% of polyolefin component (B); and from 10 to 25% by weight, more preferably from 12 to 20%, most preferably from 14 to 20%, of component (C).

The MFR (measured according to ISO 1133 at 230° C. with 2.16 kg load) of the soft polyolefin compositions of the invention is preferably from 0.05 to 25 g/10 min., more preferably from 0.05 to 15 g/10 min.

The polypropylene component (A) of the compositions of the invention is typically selected from (i) a crystalline propylene homopolymer having a preferred solubility in xylene at room temperature lower than 10% by weight, more preferably lower than 5%, and even more preferably lower than 3%, or (ii) a copolymer of propylene with at least one α-olefin of formula $H_2CH=CHR$, where R is H or a $C_{2-6}$ linear or branched alkyl, or a combination of (i) and (ii).

Preferably the copolymer of propylene (ii) contains at least 90% propylene, and has a preferred solubility in xylene at room temperature of lower than 15% by weight, more preferably lower than 10%, and even more preferably lower than 8%. Said α-olefin is preferably ethylene, butene-1, pentene-1,4-methylpentene-1, hexene-1, octene-1 or any combinations thereof, and even more preferably the copolymer of propylene (ii) is a copolymer of propylene and ethylene.

Copolymers of propylene with ethylene or with another α-olefin or a combination thereof are preferred (A) components, because they confer high transparency to the compositions of the invention.

Due to its high solubility in xylene at room temperature, the polyolefin component (B) is typically an elastomeric polymer material.

Preferably the polyolefin component (B) of the polyolefin compositions of the invention comprises a first elastomeric copolymer (1) and a second elastomeric copolymer (2), wherein, as previously said, "elastomeric" is used to define a polyolefin having high solubility in xylene at room temperature.

The first elastomeric copolymer (1) is a copolymer of ethylene with propylene and/or at least one $C_4$-$C_{10}$ α-olefin, selected in particular from α-olefins of formula $H_2CH=CHR$, where R is a $C_{2-6}$ linear or branched alkyl, optionally containing 0.5 to 5% by weight of a diene, said $C_4$-$C_{10}$ α-olefin being preferably butene-1, hexene-1 or octene-1. The ethylene content ranges from 15 to 32% by weight, preferably from 25 to 30%. The elastomeric copolymer (1) has a solubility in xylene at room temperature greater than 50% by weight, preferably greater than 70%, and even more preferably greater than 80%; the intrinsic viscosity of the xylene soluble fraction ranges from 3.0 to 5.0 dl/g, more preferably from 3.5 to 4.5 dl/g, and even more preferably from 3.8 to 4.3 dl/g. The second elastomeric copolymer (2) is a copolymer of ethylene with propylene and/or at least one $C_4$-$C_{10}$ α-olefin, selected in particular from α-olefins of formula $H_2CH=CHR$, where R is a $C_{2-6}$ linear or branched alkyl, optionally containing 0.5 to 5% by weight of a diene, said $C_4$-$C_{10}$ α-olefin being preferably butene-1, hexene-1 or octene-1. The ethylene content is greater than 32% up to 45% by weight, and preferably ranges from 35 to 40%. The elastomeric copolymer (2) has solubility in xylene at room temperature greater than 80% by weight, preferably greater than 85%, and intrinsic viscosity of the xylene soluble fraction of from 4.0 to 6.5 dl/g, preferably from 4.5 to 6.0, and more preferably from 5.0 to 5.7 dl/g. As previously reported, the copolymerization of ethylene and propylene and/or another α-olefin or combinations thereof, to form the copolymers (1) and (2) of the component (B) can occur in the presence of a diene, conjugated or not, such as butadiene, 1,4-hexadiene, 1,5-hexadiene and ethylidene-norbornene-1. The diene, when present, is in an amount of from 0.5 to 5% by weight, with respect to the weight of the component (B).

The weight ratio of the elastomeric copolymers (1)/(2) ranges from 1:5 to 5:1.

The soft polyolefin composition comprising the polypropylene component (A) and the polyolefin component (B) can be prepared by blending such components in the molten state or by sequential polymerisation in at least two stages. According to a preferred embodiment, a sequential polymerisation is carried out in the presence of a Ziegler-Natta catalyst system comprising a trialkylaluminum compound, optionally an electron donor, and a solid catalyst component comprising a halide or halogen-alcoholate of Ti and an electron-donor compound supported on anhydrous magnesium chloride, as described for example in WO 03/011962.

The said composition comprising the polypropylene component (A) and the polyolefin component (B) alone, namely without the addition of any processing aids, for example when obtained as in-reactor blend from the sequential polymerisation process mentioned above, has a very low MFR, typically a fractional MFR.

According to the invention, it can be blended as polymerized with the component (C) or can be subjected to a limited visbreaking prior to or while blending it with component (C), to achieve a partial increase of the MFR.

The term "butene-1 (co)polymer" as used herein refers to butene-1 homopolymers, copolymers and compositions thereof, having from elastomeric to plastomeric behaviour and generically also referred to as "plastomers". The "butene-1 (co)polymer" component (C) exhibits low flexural modulus and preferably also low crystallinity (less than 40% measured via X-ray, preferably less than 35%).

Preferred α-olefins, which are or may be present as comonomers in the component (C) of the compositions of the invention, are ethylene, propylene and α-olefins of formula $H_2CH=CHR$, where R is $C_{3-6}$ linear or branched alkyl, like pentene-1, hexene-1,4-methyl-1-pentene and octene-1. Particularly preferred as comonomers are propylene and ethylene.

Component (C) has preferably shore A hardness (ISO868) equal to or less than 90 points.

It is preferably selected from the hereinafter described polymers (C1) to (C3).

(C1) is a butene-1 homopolymer or copolymer of butene-1 with at least another α-olefin, preferably with propylene as comonomer, having a percentage of isotactic pentads (mmmm %) from 25 to 55%, and optionally at least one of the following properties:

intrinsic viscosity [η] measured in tetraline at 135° C. from 0.6 to 3 dL/g;

amount of xylene insoluble fraction at 0° C. from 3 to 60 wt %.

(C2) is a butene-1/ethylene copolymer having a percentage of isotactic pentads (mmmm %) equal to or higher than 96%, and a total content of ethylene units in the range of 10-25% mol corresponding to about 5-15 wt %.

The butene-1/ethylene polymer (C2) can be advantageously a composition consisting of:

a first copolymer having less than 10% mol of ethylene derived units, preferably from 1 to 9% mol, and a second copolymer having a content of ethylene derived units higher than 10% mol and for example in the range of 15-40% mol, provided that the total content of ethylene derived units is in the above said range of 10-25% mol. The highly modified component (second copolymer) has typically an elastomeric behaviour and the component (C2) can be consequently an heterophasic composition.

(C3) is a butene-1 polymer having a distribution of molecular weights (Mw/Mn) measured by GPC lower than 3 and at least one of the following properties:

no melting point (TmII) detectable at the DSC, measured according to the DSC method described herein below;

a measurable melting enthalpy (ΔHf) after aging. Particularly, the melting enthalpy of (B3) measured after 10 days of aging at room temperature, when present, is of less than 25 J/g, preferably from 4 to 20 J/g.

Thermal Properties Definition

The thermal properties (melting temperatures and entalpies) are determined by Differential Scanning calorimetry (D.S.C.) on a Perkin Elmer DSC-7 instrument. The melting temperatures of butene-1 homo and co-polymers are determined according to the following detailed method.

TmI (melting temperature of crystalline form I) is the second peak temperature found in a DSC thermogram starting from the low-temperature side after TmII (melting temperature peak of the crystalline form II). TmI is measured, when present, after storing the sample at room temperature for 10 days to allow stabilization of the cristalline form I and II. It is in fact known that when butene-1 based polymer are produced they usually crystallize from their solution in the tetragonal form II which then spontaneously transforms into the thermodynamically stable, trigonal form I, as reported in J. Appl. Phys. 1964, 35, 3241 and Macromolecules 1998, 31.

TmII (measured in second heating run): a weighted sample (5-10 mg) obtained from the polymerization is sealed into aluminum pans and heated at 200° C. with a scanning speed corresponding to 20° C./minute. The sample is kept at 200° C. for 5 minutes to allow a complete melting of all the crystallites. Successively, after cooling to −20° C. with a scanning speed corresponding to 10° C./minute, the peak temperature is taken as crystallization temperature (Tc). After standing 5 minutes at −20° C., the sample is heated for the second time at 200° C. with a scanning speed corresponding to 10° C./min. In this second heating run, the first peak temperature found starting from the low-temperature side is taken as the melting temperature (TmII) and the area as melting enthalpy (ΔHfII) of the crystalline form II, when present, that is also the global melting enthalpy in this measurement condition.

The melting enthalpy after 10 days: a weighted sample (5-10 mg) obtained from the polymerization is sealed into aluminum pans and heated at 200° C. with a scanning speed corresponding to 20° C./minute. The sample is kept at 200° C. for 5 minutes to allow a complete melting of all the crystallites. The sample is then stored for 10 days at room temperature. After 10 days the sample is subjected to DSC, it is cooled to −20° C., and then it is heated at 200° C. with a scanning speed corresponding to 10° C./min. In this heating run, the first peak temperature found starting from the low-temperature side is taken as the melting temperature (Tm substantially equal to TmII) and the area as global melting enthalpy after 10 days (ΔHf).

ΔHf is measured when the TmII (in second heating run) is not detectable (nd) and it is considered diagnostic of a low crystallinity exhibited in such case only after storage (10 days) at room temperature (25° C.).

The butene-1 (co)polymers (C1) and (C2) can be prepared by polymerization of the monomers in the presence of a low stereospecificity Ziegler-Natta catalyst comprising (a) a solid component comprising a Ti compound and an internal electron-donor compound supported on $MgCl_2$; (b) an alkylaluminum compound and, optionally, (c) an external electron-donor compound. In a preferred aspect of the process for the preparation of the (co)polymers (C1), the external electron donor compound is not used in order not to increase the stereoregulating capability of the catalyst. In cases in which the external donor is used, its amount and modalities of use should be such as not to generate a too high amount of highly stereoregular polymer, as described in the International application WO2006/042815. The butene-1 (co)polymers thus obtained typically have a content of isotactic pentads (mmmm %) from 25 to 55%. Butene-1 (co)polymers (C2) can be prepared by polymerization of the monomers in the presence of a stereospecific Ziegler Natta catalyst wherein the external electron donor compound (c) is chosen and used in amounts according to the process described in the international application WO2004/048424.

The polymerization process for butene-1 (co)polymers (C1) and (C2) can be carried out according to known techniques, for example slurry polymerization using as diluent a liquid inert hydrocarbon, or solution polymerization using for example the liquid butene-1 as a reaction medium. Moreover, it may also be possible to carry out the polymerization process in the gas-phase, operating in one or more fluidized or mechanically agitated bed reactors. The polymerization carried out in the liquid butene-1 as a reaction medium is highly preferred.

The polymerization is generally carried out at temperature of from 20 to 120° C., preferably of from 40 to 90° C. The polymerization can be carried out in one or more reactors that can work under same or different reaction conditions such as concentration of molecular weight regulator, comonomer concentration, external electron donor concentration, temperature, pressure etc.

The butene-1 polymer (C3) can be a butene-1/ethylene copolymer or a butene-1/ethylene/propylene copolymer obtained by contacting under polymerization conditions butene-1 and ethylene and optionally propylene in the presence of a metallocene catalyst system obtainable by contacting:

a stereorigid metallocene compound;

an alumoxane or a compound capable of forming an alkyl metallocene cation; and, optionally, an organo aluminum compound.

Examples of such butene-1 metallocene copolymers (C3), catalyst and process can be found in WO 2004/099269 and WO 2009/000637.

The polymerization process for the preparation of the of butene-1 polymer (C3) according to the invention can be carried out in the liquid phase in the presence or absence of an inert hydrocarbon solvent, such as in slurry, or in the gas phase. The hydrocarbon solvent can either be aromatic such as toluene, or aliphatic such as propane, hexane, heptane, isobutane or cyclohexane. Preferably the polymers (C3) of the present invention are obtained by a solution process, i.e. a process carried out in liquid phase wherein the polymer is completely or partially soluble in the reaction medium.

As a general rule, the polymerization temperature is generally comprised between −100° C. and +200° C. preferably comprised between 40° and 90° C., more preferably between 50° C. and 80° C. The polymerization pressure is generally comprised between 0.5 and 100 bar.

The lower the polymerization temperature, the higher are the resulting molecular weights of the polymers obtained.

The butene-1 polymer (C3) can be advantageously also a composition consisting of:

i) 80 wt % or more butene-1 polymers having the above said properties of (C3), ii) up to 20 wt % of a crystalline propylene polymer;

provided that the total content of ethylene and/or propylene derived units in the composition (i)+(ii) be equal to or less than 25 wt %.

The overall handability of (i) can be advantageously improved by in line compounding up to 20 wt % of the said crystalline propylene polymer component (ii), without substantial deterioration of other mechanical properties. The crystalline propylene polymer has tipically a value of melt flow rate (MFR) at 230° C., 2.16 kg of from 2 to 10 g/10 min, melting temperature DSC of from 130° C. to 160° C.

The compositions of the present invention are obtainable by melting and mixing the components, and the mixing is effected in a mixing apparatus at temperatures generally of from 180 to 310° C., preferably from 190 to 280° C., more preferably from 200 to 250° C.

Any known apparatus and technology can be used for this purpose.

Useful melt-mixing apparatus in this context are in particular extruders or kneaders, and particular preference is given to twin-screw extruders. It is also possible to premix the components at room temperature in a mixing apparatus.

The soft polyolefin compositions of the present invention find application in a variety of fields, including medical, automotive, packaging, consumer. Use of the compositions of the invention in applications in which finished articles are fabricated by injection molding is particularly advantageous.

Conventional additives, fillers and pigments, commonly used in olefin polymers, may be added, such as nucleating agents, extension oils, mineral fillers, and other organic and inorganic pigments.

The particulars are given in the following examples, which are given to illustrate, without limiting, the present invention.

Unless differently stated, the following test methods are used to determine the properties reported in the detailed description and in the examples.

Melt flow rate (MFR): measured according to ISO 1133 at 230° C. with 2.16 kg load for propylene (co)polymers, at 190° C. with 2.16 kg load for butene-1 (co)polymers.

Tensile strength at break: measured according to ISO 527 (with 5A-type test specimens tested at 500 mm/min).

Elongation at break: measured according ISO 527.

Flexural modulus (at 23° C.): measured according to ISO 178.

Shore hardness A: measured according to ISO 868 (measured after 5 sec).

The samples to be subjected to the various physical-mechanical analyses are prepared according to ISO 8986-2. 120×120×2 mm thick plaques are obtained by compression molding (at 200° C. with a cooling of 30° C./min) of a polymer composition obtained by mixing in a Brabender mixer the relevant polymer sample with 1% 2,6-di-t-butyl-4-methyl phenol (BHT) at 180° C.

Before testing, the 2 mm thick plaques are put into an autoclave at 200 bars for 10 min at room temperature in order to accelerate the phase transformation of butene-1 polymers when present.

From these plaques, S-type samples are cut and submitted to tensile strength tests with a head speed of 500 mm/min. Also the specimens for the flexural modulus and hardness Shore A are cut from these plaques. All the specimens are cut parallel to the advancement front and consequently perpendicular to the flow direction.

Butene-1 Polymers: Determination of Solubility in Xylene at 0° C. (% by Weight)

2.5 g of polymer are dissolved in 250 ml of xylene, at 135° C., under agitation. After 20 minutes, the solution is cooled to 0° C. under stirring, and then it is allowed to settle for 30 minutes. The precipitate is filtered with filter paper; the solution is evaporated under a nitrogen current, and the residue dried under vacuum at 140° C. until constant weight. The weight percentage of polymer soluble in xylene at 0° C. is then calculated. The percent by weight of polymer insoluble in xylene at room temperature is considered the isotactic index of the polymer.

Propylene Polymers: Determination of Solubility in Xylene at Room Temperature (% by Weight)

2.5 g of polymer are dissolved in 250 ml of xylene, at 135° C., under agitation. After 20 minutes, the solution is cooled to 25° C. under stirring, and then it is allowed to settle for 30 minutes. The precipitate is filtered with filter paper; the solution is evaporated under a nitrogen current, and the residue dried under vacuum at 80° C. until constant weight. The weight percentage of polymer soluble in xylene at room temperature is then calculated. The percent by weight of polymer insoluble in xylene at room temperature is considered the isotactic index of the polymer. This value corresponds substantially to the isotactic index determined by extraction with boiling n-heptane, which by definition constitutes the isotactic index of polypropylene.

Melting Temperature and Fusion Enthalpy

Determined by DSC according ISO 11357, part 3 with a heating rate of 20 K per minute.

MWD and $\overline{M}_w/\overline{M}_n$ Determination by Gel Permeation Chromatography (GPC)

MWD and particularly the ratio $\overline{M}_w/\overline{M}_n$ is determined using a Waters 150-C ALC/GPC system equipped with a TSK column set (type GMHXL-HT) working at 135° C. with 1,2-dichlorobenzene as solvent (ODCB) (stabilized with 0.1 vol. of 2,6-di-t-butyl p-cresole (BHT)) at flow rate of 1 ml/min. The sample is dissolved in ODCB by stirring continuously at a temperature of 140° C. for 1 hour.

The solution is filtered through a 0.45 μm Teflon membrane. The filtrate (concentration 0.08-1.2 g/l injection volume 300 μl) is subjected to GPC. Monodisperse fractions of polystyrene (provided by Polymer Laboratories) are used as standard. The universal calibration for butene-1 polymers is performed by using a linear combination of the Mark-Houwink constants for PS (K=7.11×10−5 dl/g; a=0.743) and PB (K=1.18×10−1 dl/g; a=0.725).

Determination of X-ray Crystallinity

The X-ray crystallinity is measured with an X-ray Diffraction Powder Diffractometer using the Cu-Kα1 radiation with fixed slits and collecting spectra between diffraction angle 2Θ=5° and 2Θ=35° with step of 0.1° every 6 seconds.

Measurements are performed on compression molded specimens in the form of disks of about 1.5-2.5 mm of thickness and 2.5-4.0 cm of diameter. These specimens are obtained in a compression molding press at a temperature of 200° C.±5° C. without any appreciable applied pressure for 10 minutes, then applying a pressure of about 10 Kg/cm² for about few second and repeating this last operation for 3 times.

The diffraction pattern is used to derive all the components necessary for the degree of cristallinity by defining a suitable linear baseline for the whole spectrum and calculating the total area (Ta), expressed in counts/sec·2Θ, between the spectrum profile and the baseline;

Then a suitable amorphous profile is defined, along the whole spectrum, that separate, according to the two phase model, the amorphous regions from the crystalline ones. Thus it is possible to calculate the amorphous area (Aa), expressed in counts/sec·2Θ, as the area between the amorphous profile and the baseline; and the cristalline area (Ca), expressed in counts/sec·2Θ, as $$Ca=Ta-Aa$$

The degree of cristallinity of the sample is then calculated according to the formula:

$$\% Cr=100\times Ca/Ta$$

Spiral Flow Measurement Test

The spiral flow evaluation is carried out by injecting molten polymer into the center of a hollow spiral mold, and measuring the total length of solidified resin to determine how far the material will flow before it solidifies under specified conditions of pressure and temperature. The following equipment and test conditions are used.

| Injection machine | SANDRETTO Series 7 190 |
|---|---|
| Clamping force | 190 ton |
| Screw diameter | 50 mm |
| Maximum volume of the injected polymer | 450 cc |
| Thickness of the spiral | 1 mm |
| Width of the spiral | 12.7 mm |
| Melting temperature | 200° C. |
| Mold Temperature | 40° C. |
| Total cycle time | 31 seconds |
| Cooling time | 20 seconds |

The spiral flow measurements are taken at the following pressures.

| Pressure Measured at Machine | Pressure Measured on Material |
|---|---|
| 60 bar | 600 bar |
| 100 bar | 1000 bar |

Note-
the pressure of the SANDRETTO machine at 60 bar corresponds to 600 bar on the molten material.

EXAMPLES 1 AND 2

A polyolefin composition comprising components A) and B), hereinafter identified as "composition (A+B)", prepared according to Example 1 of WO 03/011962 A1, is used to prepare a soft polyolefin composition according to the present invention. The polypropylene component (A) corresponds to the copolymer produced in the $1^{st}$ polymerisation stage of Table 1 of WO 03/011962 A1, and the polyolefin component (B) corresponds to the copolymer produced in the $2^{nd}$ and $3^{rd}$ polymerization stages of Table 1 of WO 03/011962.

The amount of polypropylene component (A) with respect to the total amount of (A+B) is of 16% by weight, and its ethylene content is of 3.5% by weight. The solubility in xylene at room temperature of such component (A) is of 7% by weight. The amount of the polyolefin component (B) is of 84% by weight.

Specifically, in the $2^{nd}$ polymerization stage the elastomeric copolymer (1), namely an elastomeric copolymer of propylene with 29% by weight of ethylene, is prepared, while in the $3^{rd}$ polymerization stage the elastomeric copolymer (2), namely an elastomeric copolymer of propylene with 37% by weight of ethylene, is prepared.

The amounts of such copolymers, with respect to the total weight of (A+B), and their main properties are reported below.

|  | Elastomeric copolymer (1) | Elastomeric copolymer (2) |
|---|---|---|
| Amount (weight %) | 56 | 28 |
| Solubility in xylene* (weight %) | 90 | 90 |
| I.V.** of xylene soluble fraction (dl/g) | 4.3 | 6.1 |

*at room temperature;
**Intrinsic Viscosity.

The MFR of the total composition is of 0.05 g/10 min.
The following polymer materials are used as component (C).

PB-1.a

Butene-1/propylene copolymer containing 4% by weight of propylene, having the following properties:
Flexural modulus of 31 MPa;
MFR of 0.45 g/10 min.;
percentage of isotactic pentads (mmmm %) of about 50%;
X-ray crystallinity of 29%;
hardness Sore A of 74.5.
Such copolymer was prepared using a catalyst and a polymerization process as described in WO2006/042815.

PB-1.b:

Butene-1/propylene copolymer containing 4% by weight of propylene, having the following properties:
Flexural modulus of 45.9 MPa;
MFR of 38 g/10 min.;
percentage of isotactic pentads (mmmm %) of about 50%;
intrinsic viscosity [η] measured in tetraline at 135° C. of 0.87 dL/g;
amount of xylene insoluble fraction at 0° C. of 43 wt %;
hardness Sore A of 87.5.
Such copolymer was prepared using a catalyst and a polymerization process as described in WO2006/042815, followed by thermal treatment with an organic peroxide to increase the MFR from the as-polymerized value of about 0.5 g/10 min. to the said final value of 38 g/10 min.

Preparation of the Final Composition by Melt-Blending

The composition (A+B) and component (C) are melt-blended in the amounts reported in Table 1 and tested. The test results are reported in Table 1 as well.

Melt-blending is carried out under nitrogen atmosphere in a twin screw extruder, at a rotation speed of 250 rpm and a melt temperature of 200-250° C. Such extrusion is carried out in the presence of 250 ppm by weight of the organic peroxide marketed with the trade name Luperox 101 (2,5-dimethyl-2, 5-di(tert-butyl peroxy)hexane).

COMPARISON EXAMPLE 1

For comparison purpose, the properties of the (A+B) composition in the pure state are reported in Table 1.

TABLE 1

|  | Ex. 1 | Ex. 2 | Comparison Ex. 1 |
|---|---|---|---|
| Composition (% by weight) |  |  |  |
| Component A) | 13.6 | 13.6 | 16 |
| Component B) | 71.4 | 71.4 | 84 |
| (A + B) | 85 | 85 | 100 |
| Component C) |  |  |  |
| PB-1.a | 15 | 0 | 0 |
| PB-1.b | 0 | 15 | 0 |
| Properties |  |  |  |
| Flexural modulus, MPa | 18 | 21 | 15 |
| Stress @ break, MPa | 11.9 | 10.8 | 10 |
| Elongation @ break, % | 790 | 790 | 790 |
| Hardness Shore A | 77.6 | 77 | 73 |
| Spiral length 100 bar, mm | 170 | 185 | 120 |
| Spiral length 60 bar, mm | 100 | 110 | 70 |

The invention claimed is:

1. A polyolefin composition comprising:
   (A) from 5 to 45% by weight of a polypropylene component comprising a propylene homopolymer or a propylene copolymer with another a-olefin or combinations thereof, said polypropylene component containing at least 85% by weight of propylene, and having a solubility in xylene at room temperature lower than 20% by weight;
   (B) from 82 to 45% by weight of a polyolefin component comprising a copolymer or a composition of copolymers of ethylene with at least one other a-olefin, containing from 15% by weight to 70% by weight of ethylene, said polyolefin component having a solubility in xylene at room temperature greater than 60% by weight; and
   (C) from 2.5 to 25% by weight of a butene-1 (co)polymer having:
      a content of butene-1 derived units of at least 75 wt. %;
      a flexural modulus of at most 60 MPa.

2. The polyolefin composition of claim 1, wherein the polyolefin composition has a MFR from 0.05 to 25 g/10 min.

3. The polyolefin composition of claim 1, wherein component (B) comprises:
   (1) a first elastomeric copolymer of ethylene with propylene and/or at least one $C_4$-$C_{10}$ α-olefin, optionally containing 0.5 to 5% by weight of a diene, having an ethylene content of from 15 to 32% by weight and a solubility in xylene at room temperature greater than 50% by weight, the intrinsic viscosity of the xylene soluble fraction being from 3.0 to 5.0 dl/g; and
   (2) a second elastomeric copolymer of ethylene with propylene and/or at least one $C_4$-$C_{10}$ α-olefin, optionally containing 0.5 to 5% by weight of a diene, having an ethylene content of greater than 32% up to 45% by weight and a solubility in xylene at room temperature greater than 80% by weight, the intrinsic viscosity of the xylene soluble fraction being from 4.0 to 6.5 dl/g;
   the weight ratio of the elastomeric copolymers (1)/(2) being from 1:5 to 5:1.

4. The polyolefin composition of claim 1, wherein component (C) is selected from:
   C1) a butene-1 homopolymer or copolymer of butene-1 with at least another a-olefin, having a percentage of isotactic pentads (mmmm %) from 25 to 55%;
   C2) a butene-1/ethylene copolymer having a percentage of isotactic pentads (mmmm %) of at least 96%, and a total content of ethylene units in the range of 10-25% mol; and
   C3) a butene-1 polymer having a distribution of molecular weights (Mw/Mn) measured by GPC lower than 3 and at least one of the following properties:
      no melting point (TmII) detectable at the DSC; and
      a measurable melting enthalpy (ΔHf) after aging.

5. The polyolefin composition according to claim 1 wherein component (C) has a content of butene-1 derived units of at least 80 wt %.

6. The polyolefin composition according to claim 5 wherein the content of butene-1 derived units is at least 84 wt %.

7. The polyolefin composition according to claim 6 wherein the content of butene-1 derived units is at least 90 wt %.

8. The polyolefin composition of claim 1 wherein the flexural modulus is at most 40 MPa.

9. The polyolefin composition of claim 8 wherein the flexural modulus is at most 30 MPa.

10. The polyolefin composition of claim 4 wherein component C1) is a copolymer of butene-1 and propylene.

* * * * *